United States Patent
Taya et al.

(10) Patent No.: US 9,650,523 B2
(45) Date of Patent: May 16, 2017

(54) INK, INK CARTRIDGE, AND IMAGE-RECORDING METHOD

(71) Applicant: CANON KABUSHIKI KAISHA, Tokyo (JP)

(72) Inventors: Akihiro Taya, Yokohama (JP); Masahiro Terada, Hadano (JP); Hidetaka Kawamura, Yokohama (JP); Yohei Masada, Tokyo (JP); Masanobu Ootsuka, Tokyo (JP); Takaharu Aotani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/517,645

(22) Filed: Oct. 17, 2014

(65) Prior Publication Data

US 2015/0109365 A1    Apr. 23, 2015

(30) Foreign Application Priority Data

Oct. 21, 2013  (JP) .................................. 2013-218728
Dec. 27, 2013  (JP) .................................. 2013-272057

(51) Int. Cl.
*B41J 2/01* (2006.01)
*C09D 11/107* (2014.01)
(Continued)

(52) U.S. Cl.
CPC ............. *C09D 11/107* (2013.01); *B41J 2/01* (2013.01); *B41J 2/2107* (2013.01);
(Continued)

(58) Field of Classification Search
CPC ... B41J 2/01; B41J 2/211; B41J 2/1433; B41J 2/17; B41J 2/17593; B41J 2/2107;
(Continued)

(56) References Cited

U.S. PATENT DOCUMENTS 5,643,357 A * 7/1997 Breton ................... C09D 11/34
                                                      347/100
6,153,001 A * 11/2000 Suzuki et al. ............. 106/31.65
(Continued)

FOREIGN PATENT DOCUMENTS

EP      2028242 A1     2/2009
JP   2003226827 A     8/2003
(Continued)

OTHER PUBLICATIONS

Huntsman Technical Bulletin © 2007, 2008, 2009 discloses Diethylene Glycol (DEG) has molecular weight 106.12 (see typical physical property; p. 1-2).*

(Continued)

*Primary Examiner* — Manish S Shah
(74) *Attorney, Agent, or Firm* — Canon U.S.A., Inc., IP Division

(57) ABSTRACT

Provided is an ink containing a self-dispersible pigment, an acrylic resin particle, a surfactant, a water-soluble organic solvent, and water. The surfactant includes a fluorinated surfactant represented by Formula (1) and having an HLB value determined by a Griffin method of 11 or less. The water-soluble organic solvent includes at least one water-soluble organic solvent selected from a specific group, and the total content of the water-soluble organic solvents of the specific group is 4 times or more the total content of the water-soluble organic solvents other than the solvents of the specific group. The total content of the self-dispersible pigment and the acrylic resin particle is 10% by mass or less based on the total mass of the ink.

11 Claims, 1 Drawing Sheet

(51) Int. Cl.
| | |
|---|---|
| *B41J 2/21* | (2006.01) |
| *C09D 11/322* | (2014.01) |
| *C09D 11/324* | (2014.01) |
| *C09D 11/38* | (2014.01) |
| *C09D 11/033* | (2014.01) |
| *C09D 125/14* | (2006.01) |
| *C09D 133/02* | (2006.01) |
| *C09D 133/08* | (2006.01) |

(52) U.S. Cl.
CPC .......... *C09D 11/033* (2013.01); *C09D 11/322* (2013.01); *C09D 11/324* (2013.01); *C09D 11/38* (2013.01); *C09D 125/14* (2013.01); *C09D 133/02* (2013.01); *C09D 133/08* (2013.01)

(58) Field of Classification Search
CPC .... B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC ....... 347/100, 95, 96, 101, 102, 103, 88, 99, 347/20, 21, 9; 106/31.6, 31.13, 31.27; 523/160, 161
See application file for complete search history.

(56) References Cited

U.S. PATENT DOCUMENTS

| | | | |
|---|---|---|---|
| 2004/0114013 A1* | 6/2004 | Doi | 347/100 |
| 2004/0254264 A1* | 12/2004 | Suzuki et al. | 523/160 |
| 2007/0037901 A1* | 2/2007 | Kanaya et al. | 523/160 |
| 2009/0098312 A1* | 4/2009 | Goto et al. | 427/595 |
| 2010/0196601 A1 | 8/2010 | Goto | |
| 2011/0043578 A1* | 2/2011 | Tojo | B41M 5/0023 347/102 |
| 2012/0306964 A1* | 12/2012 | Nakajima | 347/22 |
| 2012/0320133 A1 | 12/2012 | Namba | |
| 2013/0258011 A1 | 10/2013 | Boris | |

FOREIGN PATENT DOCUMENTS

| | | |
|---|---|---|
| JP | 2008-095089 A | 4/2008 |
| JP | 2010222417 A | 10/2010 |

OTHER PUBLICATIONS

Sigma-Aldrich Specification Sheet discloses Poly(ethylene glycol) has molecular weight 8500-11500 (see p. 1-2).*

* cited by examiner

INK, INK CARTRIDGE, AND IMAGE-RECORDING METHOD

BACKGROUND OF THE INVENTION

Field of the Invention

The present invention relates to an ink and relates to an ink cartridge and an image-recording method using the ink.

Description of the Related Art

In image-recording methods, inks containing self-dispersible pigments as coloring materials have been used for improving the optical densities of images. Inks containing self-dispersible pigments can form images having relatively high optical densities, but have a problem of low scratch resistance of the images. Accordingly, it has been investigated to improve the scratch resistance of images by further adding an acrylic resin particle to an ink containing a self-dispersible pigment (Japanese Patent Laid-Open No. 2010-222417). Japanese Patent Laid-Open No. 2010-222417 describes an ink containing an acrylic resin particle in addition to a self-dispersible pigment.

SUMMARY OF THE INVENTION

The ink according to the present invention contains a self-dispersible pigment, an acrylic resin particle, a surfactant, a water-soluble organic solvent, and water. The surfactant includes a fluorinated surfactant having an HLB value of 11 or less determined by a Griffin method and represented by Formula (1):

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less. The water-soluble organic solvent includes at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol, wherein the total content of the water-soluble organic solvents of Group A is 4 times or more the total content of water-soluble organic solvents other than the water-soluble organic solvents of Group A in the ink; and the total content of the self-dispersible pigment and the acrylic resin particle is 10% by mass or less based on the total mass of the ink.

An aspect of the present invention provides an ink that has good ejection stability and can achieve both a high optical density and high scratch resistance of an image. Another aspect of the present invention provides an ink cartridge and an image-recording method using the ink.

Further features of the present invention will become apparent from the following description of exemplary embodiments with reference to the attached drawings.

DESCRIPTION OF THE EMBODIMENTS

Figure 1:
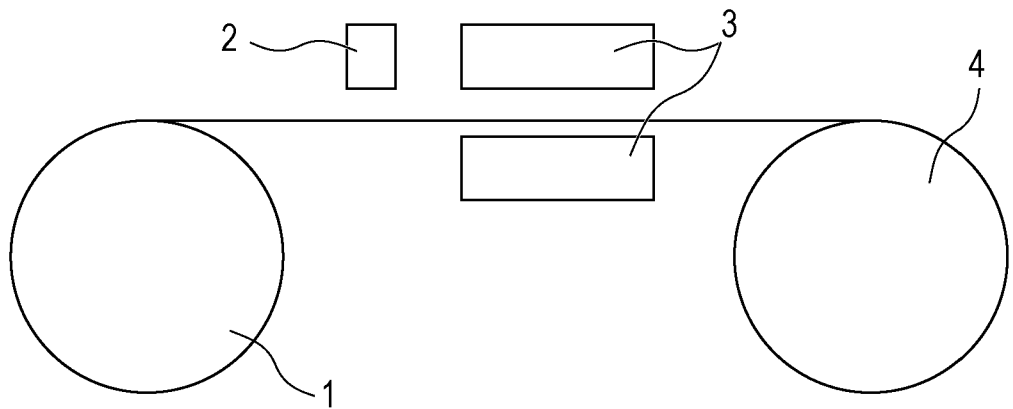
FIG. 1 is a schematic diagram illustrating an example of an image-recording apparatus used for the image-recording method of the present invention.

According to the investigation by the present inventors, however, although the scratch resistance of images formed with the ink described in Japanese Patent Laid-Open No. 2010-222417 is improved to a certain degree, which has not reached a desired level. In addition, it was revealed that the optical densities of images are decreased by containing an acrylic resin particle.

Accordingly, the present invention provides an ink having good ejection stability and capable of forming images having both a high optical density and high scratch resistance in spite of containing a self-dispersible pigment and an acrylic resin particle. The present invention also provides an ink cartridge and an image-recording method using the ink of the present invention.

The present invention will now be described in detail by preferred embodiments.

The present inventors have investigated an ink containing a self-dispersible pigment and an acrylic resin particle and a method of achieving good ejection stability and also both a high optical density and high scratch resistance of an image formed with the ink and, as a result, have reached the constitution of the present invention, i.e., an ink contains the self-dispersible pigment and the acrylic resin particle of which the sum of the contents is in a specific range and further contains a specific surfactant and a specific water-soluble organic solvent satisfying a specific content relationship. The mechanism providing the effects of the present invention by such a constitution is believed as follows.

The investigation by the present inventors revealed that the optical density and the scratch resistance of an image are improved by containing a specific fluorinated surfactant in the ink, compared to cases containing other surfactants. It is believed that this is based on that the specific fluorinated surfactant has a function of reducing the contact angle of the ink on a recording medium, compared to cases containing other surfactants. It is believed that the use of a specific fluorinated surfactant reduces the contact angle of the ink on a recording medium and allows the ink to readily spread in the horizontal direction on the surface of the recording medium and that as a result, the pigment and the resin particle tend to stay in the vicinity of the surface of the recording medium to enhance the optical density and the scratch resistance of the image. The investigation by the present inventors revealed that not all of fluorinated surfactants have the function described above and that the function is effectively achieved particularly by fluorinated surfactants having a hydrophile-lipophile balance (HLB) value of 11 or less determined by a Griffin method and represented by Formula (1):

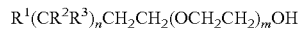

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less.

However, in some types of recording media, the optical density and the scratch resistance of an image are not sufficiently enhanced by merely using such a fluorinated surfactant. For example, in a case of using a recording medium having high ink absorbency, such as plain paper, pigments and resin particles do not sufficiently stay in the vicinity of the surface of the recording medium, and the resulting image may not have a high optical density and high scratch resistance.

The present inventors have further studied focusing on the types of the water-soluble organic solvents. As a result, it was revealed that an ink containing a specific water-soluble organic solvent in addition to a specific fluorinated surfactant mentioned above allows a pigment and a resin particle to stay in the vicinity of the surface of a recording medium, even if the recording medium has high ink absorbency, such as plain paper. The specific water-soluble organic solvent is at least one water-soluble organic solvent selected from glycerin, ethylene glycol, diethylene glycol, polyethylene glycol with a weight-average molecular weight of 10,000 or less, 1,3-propanediol, 1,4-butanediol, and diglycerol. The present inventors have found from the results of various experiments that the optical density and the scratch resistance of an image are improved by using these water-soluble organic solvent and fluorinated surfactant in combination. The mechanism of the improvements in the optical density and the scratch resistance of an image by combining a specific fluorinated surfactant and a specific water-soluble organic solvent mentioned above is not clear, but the present inventors presume that the mechanism involves that the specific water-soluble organic solvents each have two or more hydroxyl groups in the molecular structure and each have a hydroxyl group on the carbon atom at each end of the molecular structure and that the molecular structure has high symmetry.

The results of further investigation by the present inventors revealed that the effect of improving the optical density and the scratch resistance of an image can be achieved at a high level when the total content of the specific water-soluble organic solvents is 4 times or more the total content of the water-soluble organic solvents other than the specific water-soluble organic solvents, based on the total mass of the ink.

As described above, a pigment and a resin particle can stay in the vicinity of the surface of a recording medium, regardless of the type of the recording medium, when an ink containing a self-dispersible pigment and an acrylic resin particle further contains the specific fluorinated surfactant and the specific water-soluble organic solvent with a specific content relationship between the specific water-soluble organic solvents and other water-soluble organic solvents. Thus, each constitution synergistically acts on each other to allow the achievement of the effect of the present invention, i.e., a high optical density and high scratch resistance of an image.

Furthermore, it was revealed that the total content of the self-dispersible pigment and the acrylic resin particle in an ink is required to be 10% by mass or less from the viewpoint of ejection stability of the ink.

[Ink]

The ink of the present invention contains a self-dispersible pigment (hereinafter, also simply referred to as "pigment"), an acrylic resin particle, a fluorinated surfactant represented by Formula (1) and having an HLB value of 11 or less, a water-soluble organic solvent (hereinafter, also simply referred to as "surfactant represented by Formula (1)"), and water. Each component that can be used in the ink of the present invention will now be described.

<Self-Dispersible Pigment>

In the present invention, the term "self-dispersible pigment" refers to a pigment having at least one hydrophilic group bound to the pigment surface directly or via another atomic group (—R—). Examples of the hydrophilic group include —COOM, —$SO_3$M, —$PO_3$HM, and —$PO_3M_2$. In these formulae, "M" can be a hydrogen atom, an alkali metal, ammonium, or organic ammonium. In the present invention, good ejection stability of an ink can be obtained when is an alkali metal such as lithium, sodium, or potassium, compared to the cases of ammonium or organic ammonium. The hydrophilic group in the ink may be in a partially dissociated state or in an entirely dissociated state. Examples of the another atomic group (—R—) include alkylene groups having 1 to 12 carbon atoms, substituted or unsubstituted phenylene groups, and substituted or unsubstituted naphthylene groups.

(Type of Self-Dispersible Pigment)

The pigment that is contained in the ink of the present invention may be an inorganic pigment or an organic pigment, and any known pigment that can be used in an ink can be used.

Examples of the self-dispersible inorganic pigment include known inorganic pigments, such as carbon black, having surfaces to which hydrophilic groups are introduced. Examples of the self-dispersible carbon black include CAB-O-JET 200, 300, 352K, and 400 (manufactured by Cabot Corporation).

Examples of the self-dispersible organic pigment include known organic pigments having surfaces to which hydrophilic groups are introduced. Specific types of the pigments are as follows. The cyan pigment can be a copper phthalocyanine pigment, and examples thereof include C.I. Pigment Blue 1, 2, 3, 15, 15:2, 15:3, 15:4, 16, 22, and 60. Examples of self-dispersible cyan pigments include CAB-O-JET 250C, 450C, and 554B (manufactured by Cabot Corporation). The magenta pigment can be a quinacridone pigment, and examples thereof include C.I. Pigment Red 5, 7, 12, 48, 48:1, 57, 112, 122, 123, 146, 168, 184, 202, and 207. Examples of self-dispersible magenta pigments include CAB-O-JET 260M, 265M, and 465M (manufactured by Cabot Corporation). The yellow pigment can be an azo pigment, and examples thereof include C.I. Pigment Yellow 12, 13, 14, 16, 17, 74, 83, 93, 95, 97, 98, 114, 128, 129, 151, and 154. Examples of self-dispersible yellow pigments include CAB-O-JET 270Y, 470Y, and 740Y (manufactured by Cabot Corporation).

The investigation by the present inventors revealed that the physical adsorption of an acrylic resin particle to a pigment is high in the case of using an inorganic pigment, compared to the case of using an organic pigment, and that the effect of enhancing the scratch resistance of an image is high in the case of using an inorganic pigment. Among inorganic pigments, in particular, self-dispersible carbon black can be used. This is because that the self-dispersible carbon black has a property of readily causing aggregation of the pigment by, for example, evaporation of an aqueous medium after application of the ink to a recording medium.

(Content of Self-Dispersible Pigment)

The content of the self-dispersible pigment in an ink is preferably 0.1% by mass or more and 5.0% by mass or less, more preferably 1.0% by mass or more and 4.0% by mass or less, based on the total mass of the ink. A content of less than 1.0% by mass may not sufficiently improve the optical density of an image, whereas a content of higher than 4.0% by mass may not provide, for example, sufficient sticking resistance.

In addition, the total content of the self-dispersible pigment and the acrylic resin particle described below is preferably 10% by mass or less, more preferably 8% by mass or less, based on the total mass of the ink. If the total content is higher than 10% by mass, the ink may not have sufficient ejection stability.

In addition, the mass ratio of the content of the self-dispersible pigment to the content of the acrylic resin particle described below is preferably 0.5 or more and 4 or less, more preferably 1 or more and 4 or less, and most preferably 2 or more and 4 or less, based on the total mass of the ink. If the mass ratio is less than 0.5, the content of the self-dispersible pigment may be too low for sufficiently improving the optical density of an image. If the mass ratio is higher than 4, the content of the acrylic resin particle may be too low for sufficiently improving the scratch resistance of an image.

<Acrylic Resin Particle>

In the present invention, the term "acrylic resin particle" refers to an acrylic resin in a form having a particle diameter dispersed in a solvent.

(Physical Properties of Acrylic Resin Particle)

In the present invention, 50% cumulative volume average particle diameter ($D_{50}$) of the acrylic resin particle is preferably 1 nm or more and 100 nm or less and more preferably 5 nm or more and 50 nm or less. The $D_{50}$ of the acrylic resin particle can be measured using an acrylic resin particle dispersion diluted 50-fold (volume basis) with pure water with UPA-EX 150 (manufactured by Nikkiso Co., Ltd.) under conditions: SetZero: 30 s, number of measurements: three times, measuring time: 180 sec, and refractive index: 1.5.

The acrylic resin particle contained in the ink of the present invention preferably has a weight-average molecular weight (Mw) of more than 100,000 and not more than 3,000,000, more preferably 300,000 or more and 1,000,000 or less, in terms of polystyrene measured by gel permeation chromatography (GPC). An Mw of 100,000 or less reduces the strength of the acrylic resin particle, which may not sufficiently improve the scratch resistance of an image. An Mw of more than 3,000,000 may not provide, for example, sufficient storage stability and ejection stability to the ink. The weight-average molecular weight of a resin particle can be determined by measurement using an apparatus: Alliance GPC 2695 (manufactured by Waters), column: a set of four columns in series, Shodex KF-806M (manufactured by Showa Denko K.K.), detector: refractive index (RI) and calculation using PS-1 and PS-2 (manufactured by Polymer Laboratories) as polystyrene standard samples.

The acrylic resin particle contained in the ink of the present invention preferably has an acid value of 150 mg KOH/g or less and more preferably 25 mg KOH/g or more and 140 mg KOH/g or less. The acid value of the acrylic resin particle can be measured by titration. For example, a resin particle is dissolved in THF, and the acid value of the solution is measured with an automatic potentiometric titrator AT 510 (manufactured by Kyoto Electronics Manufacturing Co., Ltd.) using a potassium hydroxide ethanol titrant.

The acrylic resin particle contained in the ink of the present invention preferably has a glass transition temperature (Tg) of −20° C., more preferably −10° C. or more, and most preferably 25° C. or more, and preferably 120° C. or less and more preferably 100° C. or less.

(Content of Acrylic Resin Particle)

In the present invention, the content of the acrylic resin particle can be 0.1% by mass or more and 10.0% by mass or less, based on the total mass of the ink. A content of less than 0.1% by mass may not sufficiently improve the scratch resistance of an image, whereas a content of higher than 10.0% by mass may not provide, for example, sufficient ejection stability to the ink.

In addition, the mass ratio of the content of the acrylic resin particle to the content of a fluorinated surfactant described below is preferably 0.5 or more and 4.0 or less and more preferably 1.0 or more and 3.0 or less, based on the total mass of the ink. If the mass ratio is less than 0.5, the content of the acrylic resin particle may be too low for sufficiently improving the scratch resistance of an image. If the mass ratio is higher than 4.0, the content of the fluorinated surfactant may be too low for sufficiently improving the optical density and the scratch resistance of an image because of a difficulty in achieving the above-described effect of keeping the resin particle to stay in the vicinity of the surface of a recording medium.

(Monomer for Acrylic Resin Particle)

In the present invention, examples of monomers constituting the acrylic resin particle include alkyl(meth)acrylates such as methyl(meth)acrylate, ethyl(meth)acrylate, propyl(meth)acrylate, butyl(meth)acrylate, hexyl(meth)acrylate, octyl(meth)acrylate, lauryl(meth)acrylate, and stearyl(meth)acrylate; and (meth)acrylic acid such as acrylic acid and methacrylic acid. The acrylic resin particle may be a homopolymer of such a monomer or a copolymer with another monomer. Examples of the monomer copolymerized with the monomer mentioned above include vinyl esters, olefins, styrenes, crotonic acid, itaconic acid, maleic acid, fumaric acid, acrylamides, allyl compounds, vinyl ethers, vinyl ketones, glycidyl esters, and unsaturated nitriles. In the case of a copolymer, the proportion of the unit derived from an alkyl(meth)acrylate or (meth)acrylic acid can be 50 mol % or more in the whole copolymer.

<Surfactant>

The ink of the present invention contains a surfactant having an HLB value of 11 or less and represented by Formula (1):

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less.

As described above, the HLB value of the fluorinated surfactant determined by a Griffin method must be 11 or less. In the present invention, the HLB value can be 6 or more and 11 or less. The HLB value determined by the Griffin method is defined as "20×total formula weight of hydrophilic portion/molecular weight". In Formula (1), the portion of "$CH_2CH_2(OCH_2CH_2)_mOH$" is used as the "hydrophilic portion" in the definition.

Examples of the fluorinated surfactant represented by Formula (1) and having an HLB value of 11 or less include FS-3100, FS-30, FSO, and FSN-100 (manufactured by E.I. du Pont de Nemours and Company), Megafac F-444 (manufactured by DIC Corporation), and DSN403N (manufactured by Daikin Industries, Ltd.).

The content of the surfactant represented by Formula (1) can be 0.1% by mass or more and 5.0% by mass or less based on the total mass of the ink.

In the present invention, the ink may further contain a surfactant different from the surfactant represented by Formula (1). For example, the ink may further contain acetylene glycol or nonionic surfactant in which ethylene oxide is added to acetylene glycol. In such a case, the content of the surfactant other than the surfactant represented by Formula (1) can be 0.1% by mass or less based on the total mass of the ink.

<Water and Water-Soluble Organic Solvent>

The ink of the present invention contains water and a water-soluble organic solvent. The water can be deionized water (ion exchanged water). The content of water in the ink can be 50% by mass or more and 90% by mass or less based on the total mass of the ink.

In the present invention, the term "water-soluble organic solvent" refers to "solvent having a solubility in water at 20° C. of 500 g/L or more". The water-soluble organic solvent can be any known solvent that can be used in inks, and examples thereof include alcohols, glycols, alkylene glycols, polyethylene glycols, nitrogen-containing compounds, and sulfur-containing compounds. These water-soluble organic solvents may be used alone or in combination of two or more thereof, as necessary. The content of the water-soluble organic solvent in the ink is preferably 50% by mass or less, more preferably 5% by mass or more and 45% by mass or less, based on the total mass of the ink.

In the present invention, it is required that the ink contains at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol and that the total content of the water-soluble organic solvents of Group A is 4 times or more the total content of the water-soluble organic solvents other than the solvents of Group A. Furthermore, the total content of the water-soluble organic solvents of Group A based on the total mass of the ink is preferably at least 5 times, more preferably at least 10 times, the total content of the water-soluble organic solvents other than the solvents of Group A as the mass ratio.

In the present invention, the total content of the water-soluble organic solvents selected from Group A is preferably 50% by mass or less, more preferably 5% by mass or more and 45% by mass or less, and more preferably 10% by mass or more and 40% by mass or less, based on the total mass of the ink.

<Additive>

The ink of the present invention optionally contains various additives such as a surfactant other than that mentioned above, a pH adjuster, a corrosion inhibitor, a preservative, an antifungal agent, an antioxidant, a reducing inhibitor, an evaporation promoter, and a chelating agent.

In particular, the ink can contain at least one additive selected from the following Group B (hereinafter, also referred to as "additive of Group B").

Group B: tetritol, pentitol, hexitol, heptitol, octitol, and polyethylene glycol with a weight-average molecular weight of more than 10,000 and not more than 100,000.

The ink containing an additive of Group B can improve the ejection stability while maintaining the high optical density and scratch resistance.

In Group B, the total content of tetritol, pentitol, hexitol, heptitol, and octitol is preferably 3% by mass or more and 20% by mass or less, more preferably 5% by mass or more and 10% by mass or less, based on the total mass of the ink. In Group B, the content of the polyethylene glycol having a weight-average molecular weight of more than 10,000 and not more than 100,000 is preferably 0.0001% by mass or more and 10% by mass or less, more preferably 0.001% by mass or more and 5% by mass or less, based on the total mass of the ink. The viscosity of the ink can be 2 cP or more and 10 cP or less.

[Ink Cartridge]

The ink cartridge of the present invention includes an ink storage portion for storing an ink. The ink storage portion stores the ink of the present invention described above. The ink cartridge has, for example, a structure in which the ink storage portion is composed of an ink-accommodating chamber for containing an ink liquid and a negative pressure generating member-accommodating chamber for containing a negative pressure generating member that retains an ink therein by means of a negative pressure. Alternatively, the ink cartridge may include an ink storage portion having a structure in which the accommodating amount is wholly retained by the negative pressure generating member, without the ink-accommodating chamber for containing an ink liquid. Furthermore, the ink cartridge may be constituted so as to have an ink storage portion and a recording head.

[Image-Recording Method]

The image-recording method of the present invention includes an ink application step of applying the above-described ink to a recording medium and can further include a conveying step of conveying the recording medium and a heating step of heating the recording medium provided with the ink.

FIG. 1 is a schematic diagram illustrating an example of an image-recording apparatus used for the image-recording method of the present invention. In the image-recording apparatus shown in FIG. 1, recording is performed on a recording medium stored in a roll form and to be wound again into a roll form. The apparatus includes a recording medium feeding unit 1 for holding the recording medium in a roll form and supplying it, an ink applying unit 2 for applying an ink to the recording medium, a heating unit 3 for heating the recording medium, and a recording medium collecting unit 4 for winding the recording medium on which an image has been recorded. The recording medium is conveyed by a conveying means, such as a roller pair or a belt, along the recording medium conveying passage indicated by a solid line in the drawing and is subjected to the treatment at each unit mentioned above. The recording medium wound into a roll form by the recording medium collecting unit 4 may be supplied to, for example, another apparatus and may be cut into a desired size or subjected to treatment such as bookbinding.

In the present invention, the conveying speed of the recording medium in the conveying step of conveying a recording medium is preferably 50 m/min or more and more preferably 100 m/min or more.

In the present invention, a tension can be applied to the recording medium during the conveyance. That is, the image recording apparatus can have a tension applying means for generating a tension. Specifically, the conveying mechanism between the recording medium feeding unit 1 and the recording medium collecting unit 4 shown in FIG. 1 may be provided with, for example, a tension applying unit for causing a tension in the recording medium and a tension controlling unit for controlling the tension of the recording medium. The application of a tension to the recording medium inhibits the fibers of the recording medium from swelling by water in an ink. The swelling of the fibers of a recording medium increases the voids between fibers to increase the permeation rate of an ink. An increase in the permeation rate of an ink allows the ink to readily permeate deeply in the direction perpendicular to the surface of the recording medium, which may cause an insufficient optical density of an image. As described above, the application of a tension to a recording medium inhibits the fibers of the recording medium from swelling by the water in an ink and can inhibit the reduction in the optical density of an image due to an increase in the permeation rate of the ink.

The tension applied to the recording medium can be 20 N/m or more. A tension of 20 N/m can efficiently inhibit the fibers of a recording medium from swelling by water in an ink. Furthermore, the tension applied to the recording medium is more preferably 30 N/m or more and most preferably 40 N/m or more and 100 N/m or less.

The ink application step and the heating step will now be described.

(1) Ink Application Step

In the present invention, in the ink application step, an ink is applied to a recording medium. The ink can be applied to a recording medium by an ink jet system. That is, the image-recording method of the present invention can be an ink jet recording method. The ink jet system may be a thermal ink jet system for ejecting an ink from ejection ports of a recording head by applying thermal energy to the ink or a piezoelectric ink jet system for ejecting an ink from ejection ports of a recording head with piezoelectric devices.

The recording head may be a serial type in which recording is performed by scanning the recording head in the direction intersecting the conveying direction of the recording medium or a full-line type in which a plurality of nozzles are arrayed in a range covering an maximum width assumed to be used of a recording medium. From the viewpoint of recording an image at a higher speed, the recording head can be a full-line type ink jet recording head. In the full-line type ink jet recording head, the nozzle row can be in the direction perpendicular to the conveying direction of the recording medium. The full-line type ink jet recording head can be provided for each of different color inks, and the plurality of the recording heads can be arrayed in parallel along the conveying direction.

(2) Heating Step

In the heating step of the present invention, heating can be performed such that the surface temperature of the recording medium provided with an ink is 70° C. or more. In the present invention, the "surface temperature of a recording medium provided with an ink" refers to the temperature of the surface of a recording medium at the position when the recording medium was conveyed for 0.5 seconds after the application of an ink to the recording medium of which time is defined as 0 seconds. Specifically, when the conveying speed of a recording medium is V (m/min), the surface temperature in the ink recorded area X of the recording medium is measured at the position, along the conveying direction of the recording medium, of "V×0.5/60 (m)" from the position at which the ink has been applied (in full-line type ink jet recording head, a position directly under the recording head). In examples of the present invention, the temperature of the surface of a recording medium was measured with a non-contact infrared thermometer digital radiation thermometer FT-H20 (manufactured by Keyence Corporation) from a position of 10 cm apart from the surface of the recording medium approximately in the perpendicular direction.

In the present invention, the surface temperature of a recording medium provided with an ink can be 80° C. or more. From the viewpoint of preventing the recording medium from deformed by heat, the surface temperature can be 140° C. or less. The heating of a recording medium can be performed by, for example, heating the recording medium with a heater from the front surface side (the side to which an ink is applied) of the recording medium and/or from the back surface side.

In the present invention, the heating in the heating step may be continuously performed from before the application of an ink to after the application of the ink. In the present invention, the recording medium before the application of an ink is not heated or, even if heated, the surface temperature of the recording medium is preferably less than 70°, more preferably 60° C. or less, and most preferably 40° C. or less.

In the heating step, the recording medium may be pressurized with, for example, a pressure roller during the heating of the recording medium. The pressurization can improve the fixing of an image. The recording medium may be applied with a pressure during the whole or a part of the period of the heating step. The pressure may be applied by a multistage process. The method may further include a pressure applying step after the heating step.

<Recording Medium>

In the image-recording method of the present invention, the recording medium to which an ink is applied may be any recording medium that is usually used. Examples of the recording medium include recording media having permeability such as plain paper and glossy paper; recording media having low permeability such as printing sheets; and recording media having impermeability such as glass, plastics, and films. In particular, a recording medium having high permeability to water, an absorption coefficient Ka of 0.3 mL/m$^2$·ms$^{1/2}$ or more, can be used.

Figure 2:
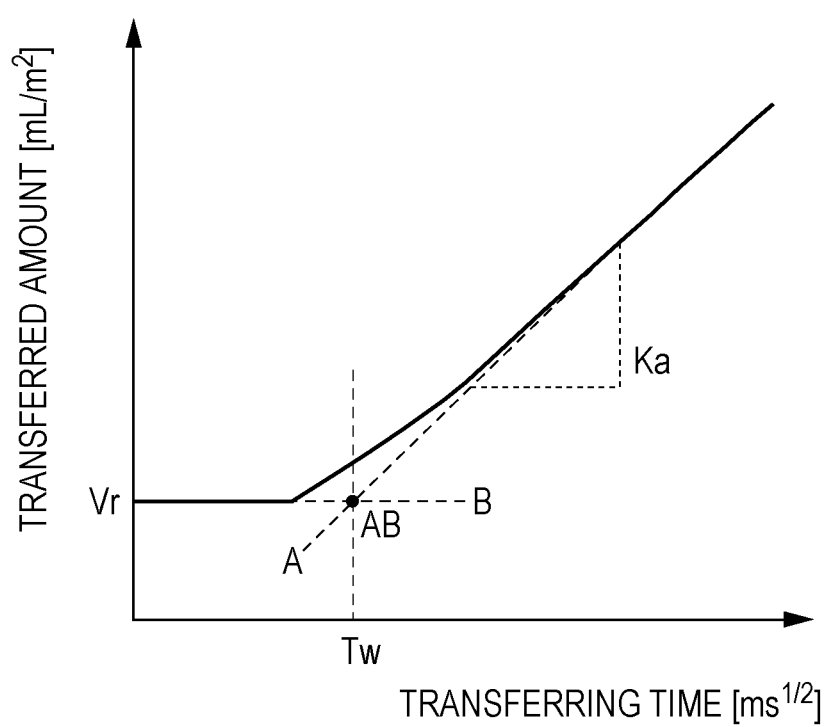
FIG. 2 is a graph showing an example of an absorption curve for explaining the absorption coefficient Ka of a recording medium.

In the present invention, the absorption coefficient Ka of a recording medium is measured by a Bristow method described in "Test Method for Liquid Absorption of Paper and Paperboard" of JAPAN TAPPI paper and pulp test method No. 51. Since the Bristow method is described in many commercially available books, the detailed description thereof is omitted. An example of absorption curve defined by a wetting time Tw, an absorption coefficient Ka (mL/m$^2$·ms$^{1/2}$), and a roughness index Vr (mL/m$^2$) is shown in FIG. 2. The absorption curve shown in FIG. 2 is based on a permeation model in which a liquid comes into contact with a recording medium and then starts permeation into the inside of the recording medium after a lapse of the wetting time Tw. The inclination of the straight line after the wetting time Tw is the absorption coefficient Ka. This absorption coefficient Ka corresponds to the permeation rate of a liquid into the inside of a recording medium. The wetting time Tw is determined, as shown in FIG. 2, as the time until an intersection point AB of an approximation straight line A by a least squares method for calculating the absorption coefficient Ka and a straight line B defined by the transferred amount V of a liquid and the roughness index Vr as V=Vr. In the present invention, water of 25° C. was used as the liquid permeating into the recording medium. That is, the value Ka in the present invention is the absorption coefficient for water at 25° C.

The recording medium that is used in the ink jet recording method of the present invention may be cut into a desired size in advance or in a roll form to be cut into a desired size after the image formation. As described above, it is easy to apply a tension to a recording medium in a roll form. Accordingly, a recording medium in a roll form can be readily used.

EXAMPLES

The present invention will now be described in more detail by examples and comparative examples, but the present invention is not limited to the following examples, within the scope of the present invention. In the following examples, the term "part(s)" is on a mass basis unless otherwise specified.

[Synthesis of Acrylic Resin Particle]

<Acrylic Resin Particle A>

"Monomers of 45 g of styrene, 22 g of n-butyl acrylate, and 38 g of acrylic acid" and 100 g of distilled water were weighed in a 300-mL four-necked flask. This flask was equipped with a stirring seal, a stirring rod, a reflux cooling tube, a septum rubber, and a nitrogen-introducing tube and was subjected to nitrogen purge for 1 hour with stirring at 300 rpm in a thermostatic chamber at 70° C. Subsequently, a solution of potassium persulfate (manufactured by Sigma-Aldrich Co. LLC.) dissolved in 100 g of distilled water was poured into the flask with a syringe to start polymerization. The state of the polymerization was monitored by gel permeation chromatography and NMR to obtain a desired polymerization product. The produced resin particle was collected by centrifugation and was redispersed in distilled water. This process was repeated to purify the resin particle in a state dispersed in water. The dispersion was then concentrated using an evaporator to obtain acrylic resin particle A having a solid concentration of 10%. The acrylic resin particle A had a glass transition temperature (Tg) of 55° C. The glass transition temperatures of the acrylic resin particle including those described below were all measured with DSC822 (manufactured by Mettler Toledo International Inc.).

<Acrylic Resin Particle B>

Acrylic resin particle B was synthesized as in the acrylic resin particle A except that "monomers of 35 g of styrene, 34 g of n-butyl acrylate, and 36 g of acrylic acid" were used. Acrylic resin particle B had a glass transition temperature of 35° C.

<Acrylic Resin Particle C>

Acrylic resin particle C was synthesized as in the acrylic resin particle A except that "monomers of 32 g of styrene, 46 g of n-butyl acrylate, and 27 g of acrylic acid" were used. Acrylic resin particle C had a glass transition temperature of 15° C.

<Acrylic Resin Particle D>

Acrylic resin particle D was synthesized as in the acrylic resin particle A except that "monomers of 23 g of styrene, 60 g of n-butyl acrylate, and 22 g of acrylic acid" were used. Acrylic resin particle D had a glass transition temperature of −5° C.

[Preparation of Ink]

Raw materials were mixed such that the contents (unit: % by mass) were as shown in Tables 1 to 5, and the mixtures were sufficiently stirred. Each of the resulting dispersions was filtered through a glass filter AP20 (manufactured by Millipore Corporation) to prepare each ink. The pigment used was self-dispersible carbon black, CAB-O-JET 400 (manufactured by Cabot Corporation). The contents (% by mass) of the pigment and the acrylic resin particle shown in the following tables are solid contents (% by mass) of the pigment and the acrylic resin particle contained in each ink.

The surfactant that is represented by Formula (1) is shown as "Formula (1)", and the surfactant that is not represented by Formula (1) is shown as "Other than Formula (1)". In each table, the water-soluble organic solvent that is selected from the following Group A is shown as "Group A", and the water-soluble organic solvent that is not included in Group A is shown as "Other than Group A". Similarly, the additive that is selected from the following Group B is shown as "Group B", and the additive that is not included in Group B is shown as "Other than Group B".

Group A: glycerin, ethylene glycol, diethylene glycol, polyethylene glycol with a weight-average molecular weight of 10,000 or less, 1,3-propanediol, 1,4-butanediol, and diglycerol.

Group B: tetritol, pentitol, hexitol, heptitol, octitol, and polyethylene glycol with a weight-average molecular weight of more than 10,000 and not more than 100,000.

The abbreviations of surfactants shown in the tables are as follows.

<Surfactant>

(1) Fluorinated Surfactant Represented by Formula (1)

(1-1) Fluorinated Surfactant Represented by Formula (1) and Having an HLB Value of 11 or Less F-444: Megafac F-444 (manufactured by DIC Corporation) [HLB value: 8.5]

FSO: Zonyl FSO (manufactured by E.I. du Pont de Nemours and Company) [HLB value: 9.5]

FS-3100: Capstone FS-3100 (manufactured by E.I. du Pont de Nemours and Company) [HLB value: 9.8]

DSN403N: Unidyne DSN-403N (manufactured by Daikin Industries, Ltd.) [HLB value: 10.0]

FS-30: Capstone FS-30 (manufactured by E.I. du Pont de Nemours and Company) [HLB value: 11.0]

(1-2) Fluorinated Surfactant Represented by Formula (1) and Having an HLB Value of Higher than 11

S-242: Surflon S-242 (manufactured by AGC Seimi Chemical Co., Ltd.) [HLB value: 12.0]

S-243: Surflon S-243 (manufactured by AGC Seimi Chemical Co., Ltd.) [HLB value: 15.0]

(2) Surfactant Other than Formula (1)

(2-1) Fluorinated Surfactant Other than Formula (1)

Ftergent 250: Ftergent 250 (manufactured by Neos Company Limited) [HLB value: 10.4]

(2-2) Surfactant Other than Fluorinated Surfactant

AE100: acetylene glycol-based surfactant, Acetylenol E100 (manufactured by Kawaken Fine Chemicals Co., Ltd.) [HLB value: 16.3]

TABLE 1

| | | | | Ink preparation conditions | | | | | | | | | | | | | |
|---|---|---|---|---|---|---|---|---|---|---|---|---|---|---|---|---|---|
| | Ink No. | | | Ink 1 | Ink 2 | Ink 3 | Ink 4 | Ink 5 | Ink 6 | Ink 7 | Ink 8 | Ink 9 | Ink 10 | Ink 11 | Ink 12 | Ink 13 | Ink 14 |
| Pigment (solid content) | | | | 4.0 | 4.0 | 4.0 | 4.0 | 4.0 | 4.0 | 4.0 | 4.0 | 4.0 | 4.0 | 4.0 | 4.0 | 4.0 | 4.0 |
| Acrylic resin particle (solid content) | | A | | 1.0 | 0 | 0 | 0 | 1.0 | 1.0 | 1.0 | 1.0 | 1.0 | 1.0 | 1.0 | 1.0 | 1.0 | 1.0 |
| | | B | | 0 | 1.0 | 0 | 0 | 0 | 0 | 0 | 0 | 0 | 0 | 0 | 0 | 0 | 0 |
| | | C | | 0 | 0 | 1.0 | 0 | 0 | 0 | 0 | 0 | 0 | 0 | 0 | 0 | 0 | 0 |
| | | D | | 0 | 0 | 0 | 1.0 | 0 | 0 | 0 | 0 | 0 | 0 | 0 | 0 | 0 | 0 |
| Surfactant | Formula (1) | F-444 | HLB value: 8.5 | 1.0 | 1.0 | 1.0 | 1.0 | 1.0 | 1.0 | 1.0 | 1.0 | 1.0 | 0 | 0 | 0 | 0 | 1.0 |
| | | FSO | HLB value: 9.5 | 0 | 0 | 0 | 0 | 0 | 0 | 0 | 0 | 0 | 1.0 | 0 | 0 | 0 | 0 |

TABLE 1-continued

Ink preparation conditions

| | | | Ink 1 | Ink 2 | Ink 3 | Ink 4 | Ink 5 | Ink 6 | Ink 7 | Ink 8 | Ink 9 | Ink 10 | Ink 11 | Ink 12 | Ink 13 | Ink 14 |
|---|---|---|---|---|---|---|---|---|---|---|---|---|---|---|---|---|
| | | Ink No. | | | | | | | | | | | | | | |
| | | FS-3100 HLB value: 9.8 | 0 | 0 | 0 | 0 | 0 | 0 | 0 | 0 | 0 | 0 | 1.0 | 0 | 0 | 0 |
| | | DSN 403N HLB value: 10.0 | 0 | 0 | 0 | 0 | 0 | 0 | 0 | 0 | 0 | 0 | 0 | 1.0 | 0 | 0 |
| | | FS-30 HLB value: 11.0 | 0 | 0 | 0 | 0 | 0 | 0 | 0 | 0 | 0 | 0 | 0 | 0 | 1.0 | 0 |
| Water-soluble organic solvent | Group A | Glycerin | 20.0 | 20.0 | 20.0 | 20.0 | 0 | 0 | 0 | 0 | 20.0 | 20.0 | 20.0 | 20.0 | 20.0 | 18.0 |
| | | Ethylene glycol | 0 | 0 | 0 | 0 | 20.0 | 0 | 0 | 0 | 0 | 0 | 0 | 0 | 0 | 0 |
| | | Diethylene glycol | 0 | 0 | 0 | 0 | 0 | 20.0 | 0 | 0 | 0 | 0 | 0 | 0 | 0 | 0 |
| | | Polyethylene glycol (molecular weight: 1,000) | 0 | 0 | 0 | 0 | 0 | 0 | 20.0 | 0 | 0 | 0 | 0 | 0 | 0 | 0 |
| | | 1,3-Propanediol | 0 | 0 | 0 | 0 | 0 | 0 | 0 | 20.0 | 0 | 0 | 0 | 0 | 0 | 0 |
| | | 1,4-Butanediol | 0 | 0 | 0 | 0 | 0 | 0 | 0 | 0 | 20.0 | 0 | 0 | 0 | 0 | 0 |
| | Other than Group A | 2-Methyl-1,3-propanediol | 0 | 0 | 0 | 0 | 0 | 0 | 0 | 0 | 0 | 0 | 0 | 0 | 0 | 2.0 |
| | Ion-exchanged water | | 74.0 | 74.0 | 74.0 | 74.0 | 74.0 | 74.0 | 74.0 | 74.0 | 74.0 | 74.0 | 74.0 | 74.0 | 74.0 | 74.0 |
| | Content of pigment/content of acrylic resin particle (times) | | 4.0 | 4.0 | 4.0 | 4.0 | 4.0 | 4.0 | 4.0 | 4.0 | 4.0 | 4.0 | 4.0 | 4.0 | 4.0 | 4.0 |
| | Total content of water-soluble organic solvent of Group A/Total content of water-soluble organic solvent other than the solvent of Group A (times) | | — | — | — | — | — | — | — | — | — | — | — | — | — | 9.0 |

TABLE 2

Ink preparation conditions

| | | | Ink 15 | Ink 16 | Ink 17 | Ink 18 | Ink 19 | Ink 20 | Ink 21 | Ink 22 | Ink 23 | Ink 24 | Ink 25 | Ink 26 | Ink 27 | Ink 28 |
|---|---|---|---|---|---|---|---|---|---|---|---|---|---|---|---|---|
| | | Ink No. | | | | | | | | | | | | | | |
| Pigment (solid content) | | | 4.0 | 4.0 | 4.0 | 4.0 | 4.0 | 4.0 | 4.0 | 4.0 | 5.0 | 4.0 | 2.5 | 4.0 | 3.0 | 6.0 |
| Acrylic resin particle A (solid content) | | | 1.0 | 1.0 | 1.0 | 1.0 | 1.0 | 1.0 | 1.0 | 1.0 | 1.0 | 0.8 | 7.5 | 1.0 | 6.0 | 4.0 |
| Surfactant | Formula (1) | F-444 HLB value: 8.5 | 1.0 | 1.0 | 0.5 | 0.5 | 1.0 | 0 | 1.0 | 1.0 | 1.0 | 1.0 | 1.0 | 1.0 | 1.0 | 1.0 |
| | | FSO HLB value: 9.5 | 0 | 0 | 0 | 0.5 | 0 | 0 | 0 | 0 | 0 | 0 | 0 | 0 | 0 | 0 |
| | | DSN403N HLB value: 10.0 | 0 | 0 | 0 | 0 | 0 | 1.0 | 0 | 0 | 0 | 0 | 0 | 0 | 0 | 0 |
| | | FS-30 HLB value: 11.0 | 0 | 0 | 0.5 | 0 | 0 | 0 | 0 | 0 | 0 | 0 | 0 | 0 | 0 | 0 |
| | Other than Formula (1) | AE 100 HLB value: 16.3 | 0 | 0 | 0 | 0 | 0 | 0 | 0.1 | 0.2 | 0 | 0 | 0 | 0 | 0 | 0 |
| Water-soluble organic solvent | Group A | Glycerin | 17.0 | 16.0 | 6.0 | 6.0 | 0 | 10.0 | 20.0 | 20.0 | 20.0 | 20.0 | 20.0 | 20.0 | 20.0 | 20.0 |
| | | Ethylene glycol | 0 | 0 | 5.0 | 0 | 0 | 0 | 0 | 0 | 0 | 0 | 0 | 0 | 0 | 0 |
| | | Diethylene glycol | 0 | 0 | 5.0 | 0 | 6.0 | 6.0 | 0 | 0 | 0 | 0 | 0 | 0 | 0 | 0 |
| | | Polyethylene glycol (molecular weight: 1,000) | 0 | 0 | 0 | 0 | 5.0 | 0 | 0 | 0 | 0 | 0 | 0 | 0 | 0 | 0 |
| | | 1,3-Propanediol | 0 | 0 | 0 | 5.0 | 0 | 0 | 0 | 0 | 0 | 0 | 0 | 0 | 0 | 0 |
| | | 1,4-Butanediol | 0 | 0 | 0 | 5.0 | 5.0 | 0 | 0 | 0 | 0 | 0 | 0 | 0 | 0 | 0 |
| | Other than Group A | 2-Methyl-1,3-propanediol | 3.0 | 4.0 | 4.0 | 0 | 0 | 4.0 | 0 | 0 | 0 | 0 | 0 | 0 | 0 | 0 |
| | | N-Methyl-2-pyrrolidone | 0 | 0 | 0 | 0 | 4.0 | 0 | 0 | 0 | 0 | 0 | 0 | 0 | 0 | 0 |
| | | Trimethylolpropane | 0 | 0 | 0 | 4.0 | 0 | 0 | 0 | 0 | 0 | 0 | 0 | 0 | 0 | 0 |
| Ion-exchanged water | | | 74.0 | 74.0 | 74.0 | 74.0 | 74.0 | 74.0 | 73.9 | 73.8 | 73.0 | 74.2 | 69.0 | 74.0 | 70.0 | 69.0 |
| Content of pigment/content of acrylic resin particle (times) | | | 4.0 | 4.0 | 4.0 | 4.0 | 4.0 | 4.0 | 4.0 | 4.0 | 5.0 | 5.0 | 0.3 | 4.0 | 0.5 | 1.5 |
| Total content of water-soluble organic solvent of Group A/Total content of water-soluble organic solvent other than the solvent of Group A (times) | | | 5.7 | 4.0 | 4.0 | 4.0 | 4.0 | 4.0 | — | — | — | — | — | — | — | — |

TABLE 3

| | | | Ink 29 | Ink 30 | Ink 31 | Ink 32 | Ink 33 | Ink 34 | Ink 35 | Ink 36 | Ink 37 | Ink 38 | Ink 39 | Ink 40 | Ink 41 | Ink 42 |
|---|---|---|---|---|---|---|---|---|---|---|---|---|---|---|---|---|
| | | Ink No. | | | | | | | | | | | | | | |
| | Pigment (solid content) | | 4.0 | 4.0 | 4.0 | 4.0 | 4.0 | 4.0 | 4.0 | 4.0 | 4.0 | 4.0 | 4.0 | 4.0 | 4.0 | 4.0 |
| | Acrylic resin particle A (solid content) | | 1.0 | 1.0 | 1.0 | 1.0 | 1.0 | 1.0 | 1.0 | 1.0 | 1.0 | 1.0 | 1.0 | 1.0 | 1.0 | 1.0 |
| Surfactant | Formula (1) | F-444 HLB value: 8.5 | 1.0 | 1.0 | 1.0 | 1.0 | 1.0 | 1.0 | 1.0 | 1.0 | 1.0 | 1.0 | 1.0 | 1.0 | 1.0 | 1.0 |
| Water-soluble organic solvent | Group A | Glycerin | 20.0 | 20.0 | 20.0 | 20.0 | 20.0 | 20.0 | 20.0 | 20.0 | 20.0 | 20.0 | 20.0 | 15.0 | 14.0 | 10.0 |
| | Other than Group A | 2-Methyl-1,3-propanediol | 0 | 0 | 0 | 0 | 0 | 0 | 0 | 0 | 0 | 0 | 0 | 5.0 | 6.0 | 10.0 |
| Additive | Group B | Tetritol | 7.0 | 0 | 0 | 0 | 0 | 0 | 0 | 0 | 0 | 0 | 0 | 0 | 0 | 0 |
| | | Pentitol | 0 | 7.0 | 0 | 0 | 0 | 0 | 0 | 0 | 0 | 0 | 0 | 0 | 0 | 0 |
| | | Hexitol | 0 | 0 | 7.0 | 0 | 0 | 0 | 0 | 0 | 0 | 0 | 0 | 0 | 0 | 0 |
| | | Heptitol | 0 | 0 | 0 | 7.0 | 0 | 0 | 0 | 0 | 0 | 0 | 0 | 0 | 0 | 0 |
| | | Octitol | 0 | 0 | 0 | 0 | 7.0 | 0 | 0 | 0 | 0 | 0 | 0 | 0 | 0 | 0 |
| | | Polyethylene glycol (molecular weight: 20,000) | 0 | 0 | 0 | 0 | 0 | 1.0 | 0 | 0 | 0 | 0 | 0 | 0 | 0 | 0 |
| | Other than Group B | Urea | 0 | 0 | 0 | 0 | 0 | 0 | 7.0 | 0 | 0 | 0 | 0 | 0 | 0 | 0 |
| | | N-Methyl-morpholine N-oxide | 0 | 0 | 0 | 0 | 0 | 0 | 0 | 7.0 | 0 | 0 | 0 | 0 | 0 | 0 |
| | | Xanthan gum | 0 | 0 | 0 | 0 | 4.0 | 0 | 0 | 0 | 0.01 | 0 | 0 | 0 | 0 | 0 |
| | | Sodium alginate | 0 | 0 | 0 | 0 | 0 | 0 | 0 | 0 | 0 | 0.01 | 0 | 0 | 0 | 0 |
| | | Polyvinyl alcohol | 0 | 0 | 0 | 0 | 0 | 0 | 0 | 0 | 0 | 0 | 0.01 | 0 | 0 | 0 |
| | Ion-exchanged water | | 67.0 | 67.0 | 67.0 | 67.0 | 67.0 | 73.0 | 67.0 | 67.0 | 74.0 | 74.0 | 74.0 | 74.0 | 74.0 | 74.0 |
| | Content of pigment/content of acrylic resin particle (times) | | 4.0 | 4.0 | 4.0 | 4.0 | 4.0 | 4.0 | 4.0 | 4.0 | 4.0 | 4.0 | 4.0 | 4.0 | 4.0 | 4.0 |
| | Total content of water-soluble organic solvent of Group A/Total content of water-soluble organic solvent other than the solvent of Group A (times) | | — | — | — | — | — | — | — | — | — | — | — | 3.0 | 2.3 | 1.0 |

TABLE 4

| | | | Ink 43 | Ink 44 | Ink 45 | Ink 46 | Ink 47 | Ink 48 | Ink 49 | Ink 50 | Ink 51 | Ink 52 | Ink 53 | Ink 54 | Ink 55 | Ink 56 |
|---|---|---|---|---|---|---|---|---|---|---|---|---|---|---|---|---|
| | | Ink No. | | | | | | | | | | | | | | |
| | Pigment (solid content) | | 4.0 | 4.0 | 4.0 | 4.0 | 4.0 | 4.0 | 4.0 | 4.0 | 4.0 | 4.0 | 4.0 | 4.0 | 4.0 | 4.0 |
| | Acrylic resin particle A (solid content) | | 1.0 | 1.0 | 1.0 | 1.0 | 1.0 | 1.0 | 1.0 | 1.0 | 1.0 | 1.0 | 1.0 | 1.0 | 1.0 | 1.0 |
| Surfactant | Formula (1) | F-444 HLB value: 8.5 | 1.0 | 1.0 | 1.0 | 1.0 | 1.0 | 1.0 | 1.0 | 1.0 | 1.0 | 1.0 | 1.0 | 0 | 0 | 0 |
| | | S-242 HLB value: 12.0 | 0 | 0 | 0 | 0 | 0 | 0 | 0 | 0 | 0 | 0 | 0 | 1.0 | 0 | 0 |
| | | S-243 HLB value: 15.0 | 0 | 0 | 0 | 0 | 0 | 0 | 0 | 0 | 0 | 0 | 0 | 0 | 1.0 | 0 |
| | Other than Formula (1) | Ftergent 250 HLB value: 10.4 | 0 | 0 | 0 | 0 | 0 | 0 | 0 | 0 | 0 | 0 | 0 | 0 | 0 | 1.0 |
| Water-soluble organic solvent | Group A | Glycerin | 0 | 0 | 0 | 0 | 0 | 0 | 0 | 0 | 0 | 0 | 0 | 20.0 | 20.0 | 20.0 |
| | Other than Group A | 2-Methyl-1,3-propanediol | 20.0 | 0 | 0 | 0 | 0 | 0 | 0 | 10.0 | 0 | 0 | 5.0 | 0 | 0 | 0 |
| | | Diethylene glycol mono-butyl ether | 0 | 20.0 | 0 | 0 | 0 | 0 | 0 | 0 | 5.0 | 0 | 0 | 0 | 0 | 0 |

TABLE 4-continued

Ink preparation conditions

| Ink No. | Ink 43 | Ink 44 | Ink 45 | Ink 46 | Ink 47 | Ink 48 | Ink 49 | Ink 50 | Ink 51 | Ink 52 | Ink 53 | Ink 54 | Ink 55 | Ink 56 |
|---|---|---|---|---|---|---|---|---|---|---|---|---|---|---|
| 2-Pyrrolidone | 0 | 0 | 20.0 | 0 | 0 | 0 | 0 | 10.0 | 0 | 10.0 | 5.0 | 0 | 0 | 0 |
| N-Methyl-2-pyrrolidone | 0 | 0 | 0 | 20.0 | 0 | 0 | 0 | 0 | 5.0 | 0 | 0 | 0 | 0 | 0 |
| Hexylene glycol | 0 | 0 | 0 | 0 | 20.0 | 0 | 0 | 0 | 5.0 | 10.0 | 5.0 | 0 | 0 | 0 |
| Trimethylol-propane | 0 | 0 | 0 | 0 | 0 | 20.0 | 0 | 0 | 5.0 | 0 | 0 | 0 | 0 | 0 |
| 1,2-Hexanediol | 0 | 0 | 0 | 0 | 0 | 0 | 20.0 | 0 | 0 | 0 | 5.0 | 0 | 0 | 0 |
| Ion-exchanged water | 74.0 | 74.0 | 74.0 | 74.0 | 74.0 | 74.0 | 74.0 | 74.0 | 74.0 | 74.0 | 74.0 | 74.0 | 74.0 | 74.0 |
| Content of pigment/content of acrylic resin particle (times) | 4.0 | 4.0 | 4.0 | 4.0 | 4.0 | 4.0 | 4.0 | 4.0 | 4.0 | 4.0 | 4.0 | 4.0 | 4.0 | 4.0 |
| Total content of water-soluble organic solvent of Group A/Total content of water-soluble organic solvent other than the solvent of Group A (times) | 0 | 0 | 0 | 0 | 0 | 0 | 0 | 0 | 0 | 0 | 0 | — | — | — |

TABLE 5

Ink preparation conditions

| | | | Ink 57 | Ink 58 | Ink 59 | Ink 60 | Ink 61 | Ink 62 | Ink 63 | Ink 64 | Ink 65 | Ink 66 | Ink 67 | Ink 68 | Ink 69 | Ink 70 | Ink 71 |
|---|---|---|---|---|---|---|---|---|---|---|---|---|---|---|---|---|---|
| | Pigment (solid content) | | 4.0 | 4.0 | 4.0 | 4.0 | 4.0 | 4.0 | 4.0 | 4.0 | 4.0 | 4.0 | 4.0 | 4.0 | 4.0 | 4.0 | 4.0 |
| | Acrylic resin particle A (solid content) | | 1.0 | 1.0 | 1.0 | 1.0 | 1.0 | 1.0 | 1.0 | 1.0 | 1.0 | 1.0 | 1.0 | 1.0 | 1.5 | 0 | 1.0 |
| Surfactant | Formula (1) | F-444 HLB value: 8.5 | 0 | 0 | 0 | 0 | 0 | 0 | 0 | 0 | 0 | 0 | 0 | 0 | 0 | 1.0 | 1.0 |
| | | S-242 HLB value: 12.0 | 0 | 1.0 | 0 | 0 | 0 | 1.0 | 0 | 0 | 1.0 | 0 | 0 | 0 | 1.0 | 0 | 0 |
| | | S-243 HLB value: 15.0 | 0 | 0 | 1.0 | 0 | 0 | 0 | 1.0 | 0 | 0 | 1.0 | 0 | 0 | 0 | 0 | 0 |
| | Other than Formula (1) | Ftergent 250 HLB value: 10.4 | 0 | 0 | 0 | 1.0 | 0 | 0 | 0 | 1.0 | 0 | 0 | 1.0 | 0 | 0 | 0 | 0 |
| | | AE100 HLB value: 16.3 | 1.0 | 0 | 0 | 0 | 1.0 | 0 | 0 | 0 | 0 | 0 | 0 | 1.0 | 0 | 0 | 0 |
| Water-soluble organic solvent | Group A | Glycerin | 20.0 | 20.0 | 20.0 | 20.0 | 20.0 | 20.0 | 20.0 | 20.0 | 20.0 | 20.0 | 20.0 | 20.0 | 5.0 | 20.0 | 0 |
| | | Diethylene glycol | 0 | 0 | 0 | 0 | 0 | 0 | 0 | 0 | 0 | 0 | 0 | 0 | 5.0 | 0 | 0 |
| | | 1,3-Propanediol | 0 | 0 | 0 | 0 | 0 | 0 | 0 | 0 | 0 | 0 | 0 | 0 | 5.0 | 0 | 0 |
| | | Diglycerol | 0 | 0 | 0 | 0 | 0 | 0 | 0 | 0 | 0 | 0 | 0 | 0 | 0 | 0 | 20 |
| | Other than Group A | 2-Methyl-1,3-propanediol | 0 | 0 | 0 | 0 | 0 | 0 | 0 | 0 | 0 | 0 | 0 | 0 | 5.0 | 0 | 0 |
| Additive | Group B | Tetritol | 0 | 7.0 | 0 | 0 | 0 | 0 | 0 | 0 | 0 | 0 | 0 | 0 | 0 | 0 | 0 |
| | | Pentitol | 0 | 0 | 7.0 | 0 | 0 | 0 | 0 | 0 | 0 | 0 | 0 | 0 | 0 | 0 | 0 |
| | | Hexitol | 0 | 0 | 0 | 7.0 | 0 | 0 | 0 | 0 | 0 | 0 | 0 | 0 | 0 | 0 | 0 |
| | | Hepitol | 0 | 0 | 0 | 0 | 7.0 | 0 | 0 | 0 | 0 | 0 | 0 | 0 | 0 | 0 | 0 |
| | | Ocitol | 0 | 0 | 0 | 0 | 0 | 7.0 | 0 | 0 | 0 | 0 | 0 | 0 | 0 | 0 | 0 |
| | | Polyethylene glycol (molecular weight: 20,000) | 0 | 0 | 0 | 0 | 0 | 0 | 1.0 | 0 | 0 | 0 | 0 | 0 | 0 | 0 | 0 |
| | Other than Group B | Urea | 0 | 0 | 0 | 0 | 0 | 0 | 0 | 7.0 | 0 | 0 | 0 | 0 | 0 | 0 | 0 |
| | | N-Methylmorpholine N-oxide | 0 | 0 | 0 | 0 | 0 | 0 | 0 | 0 | 7.0 | 0 | 0 | 0 | 0 | 0 | 0 |
| | | Xanthan Gum | 0 | 0 | 0 | 0 | 0 | 0 | 0 | 0 | 0 | 0.01 | 0 | 0 | 0 | 0 | 0 |
| | | Sodium alginate | 0 | 0 | 0 | 0 | 0 | 0 | 0 | 0 | 0 | 0 | 0.01 | 0 | 0 | 0 | 0 |
| | | Polyvinyl alcohol | 0 | 0 | 0 | 0 | 0 | 0 | 0 | 0 | 0 | 0 | 0 | 0.01 | 0 | 0 | 0 |
| | Ion-exchanged water | | 74.0 | 67.0 | 67.0 | 67.0 | 67.0 | 67.0 | 73.0 | 67.0 | 67.0 | 74.0 | 74.0 | 74.0 | 74.5 | 75.0 | 74.0 |
| | Content of pigment/content of acrylic resin particle (times) | | 4.0 | 4.0 | 4.0 | 4.0 | 4.0 | 4.0 | 4.0 | 4.0 | 4.0 | 4.0 | 4.0 | 4.0 | 8.0 | — | 4.0 |
| | Total content of water-soluble organic solvent of Group A/Total content of water-soluble organic solvent other than the solvent of Group A (times) | | — | — | — | — | — | — | — | — | — | — | — | — | 3.0 | — | — |

[Production of Image Samples]

Image Sample 1 was produced by recording a solid image (recording duty: 100%) of 3×3 cm on a recording medium: OK Prince High Quality (basis weight: 64 g/m²) (manufactured by Oji Paper Co., Ltd.) with the ink jet recording apparatus shown in FIG. 1 loaded with a piezoelectric ink jet head KJ4 (nozzle density: 600 dpi, manufactured by Kyocera Corporation) under the conditions shown in Tables 6 and 7 (type of the ink used, surface temperature of the recording medium at application of an ink, and a tension applied to the recording medium with a tension applying means). Image Sample 2 was prepared by recording three lines with a width of 3 mm and one line with a width of 17 mm (each recording duty: 100%) so as to be parallel to each other on a recording medium: DL9084 (basis weight: 91 g/m²) (manufactured by Mitsubishi Paper Mills Limited.). The recording conditions were a temperature of 25° C., a relative humidity of 55%, an ink ejection frequency of 39 kHz, a recording medium-conveying speed of 100 m/s, and an ink ejection volume of about 13 pL per dot on recording. The symbol "-" shown in the column "Tension applied to recording medium" in each table means that the operation by a tension applying means, i.e., application to a recording medium a specific tension higher than the tension caused by conveying the recording medium, is not performed. In the ink jet recording apparatus, the recording conditions of applying ink droplets of 13 ng per dot to a unit region of 1/600×1/600 inch with a resolution of 600×600 dpi is defined as a recording duty of 100%. The surface temperature of a recording medium on the application of an ink was measured with a non-contact infrared thermometer digital radiation thermometer FT-H20 (manufactured by Keyence Corporation) from a position of 10 cm apart from the surface of the recording medium approximately in the perpendicular direction.

[Evaluation]

In the present invention, in the following evaluation criteria of each evaluation item, AA to B are acceptable levels, and C is an unacceptable level.

<Optical Density of Image>

The optical density of the resulting image sample was measured with a reflection densitometer RD19I (manufactured by Gretag Macbeth AG). The optical density of each image was evaluated by the following evaluation criteria. The evaluation results are shown in Tables 6 and 7.

AA: optical density≥1.50 or more,
A: 1.50>optical density≥1.45,
B: 1.45>optical density≥1.40, and
C: 1.40>optical density.

<Scratch Resistance of Image>

OK Topcoat+ (basis weight: 105 g/m²) (manufactured by Oji Paper Co., Ltd.) was superposed on the image of Image Sample 2 within 3 minutes after the recording, and a weight of 500 g was further placed thereon such that the contact area was 12.6 cm². A scratch resistance test was performed by scraping the recording medium recorded with Image Sample 2 and OK Topcoat+once at a relative speed of 10 cm/s such that the contact area of the weight intersects the recorded four lines at right angles. Subsequently, the ink adhered to the OK Topcoat+ in the area of 12.6 cm² on which the weight was placed was read with a scanner (multifunction printer iR3245F (manufactured by CANON KABUSHIKI KAISHA), 600 dpi, gray-scale, picture mode), and the proportion of the area of which the brightness in 256 tones was lower than 128 (proportion of the ink-adhered area) was calculated. The scratch resistance of each image was evaluated by the following evaluation criteria. The evaluation results are shown in Tables 6 and 7.

AA: proportion of ink-adhered area≤1%,
A: 1%<proportion of ink-adhered area≤3%,
B: 3%<proportion of ink-adhered area≤5%, and
C: 5%<proportion of ink-adhered area.

[Evaluation of Ejection Stability]

Each ink was loaded in the yellow ink tank of an ink jet printer PX-205 (manufactured by Seiko Epson Corporation), and image data of yellow ({R,G,B}={255,255,0} in RGB 256 tones) was successively printed as an A4 size image on ten sheets at standard print quality to prepare image samples. The resulting image samples were visually investigated to evaluate the ejection stability by the following evaluation criteria. The evaluation results are shown in Tables 6 and 7.

A: no stripe and color unevenness were observed in all ten image sample sheets, and
B: a stripe or color unevenness was observed in any of the image sample sheets.

TABLE 6

Ink recording conditions and evaluation results

| Example No. | Ink No. | Content of pigment/ Content of acrylic resin particles (times) | Total content of water-soluble organic solvent of Group/Total content of water-soluble organic solvent other than Group (times) | Surface temperature of recording medium at application of ink (° C.) | Tension applied to recording medium (N/m) | Optical density of image | Scratch resistance of image | Ejection stability of Ink |
|---|---|---|---|---|---|---|---|---|
| Example 1 | Ink 1 | 4.0 | — | 25 | — | A | A | B |
| Example 2 | Ink 1 | 4.0 | — | 70 | — | AA | AA | B |
| Example 3 | Ink 1 | 4.0 | — | 25 | 20 | A | A | B |
| Example 4 | Ink 2 | 4.0 | — | 25 | — | A | B | B |
| Example 5 | Ink 3 | 4.0 | — | 25 | — | A | B | B |
| Example 6 | Ink 4 | 4.0 | — | 25 | — | A | B | B |
| Example 7 | Ink 5 | 4.0 | — | 25 | — | A | A | B |
| Example 8 | Ink 6 | 4.0 | — | 25 | — | A | A | B |
| Example 9 | Ink 7 | 4.0 | — | 25 | — | A | A | B |
| Example 10 | Ink 8 | 4.0 | — | 25 | — | A | A | B |

TABLE 6-continued

Ink recording conditions and evaluation results

| Example No. | Ink No. | Content of pigment/ Content of acrylic resin particles (times) | Total content of water-soluble organic solvent of Group/Total content of water-soluble organic solvent other than Group (times) | Surface temperature of recording medium at application of ink (° C.) | Tension applied to recording medium (N/m) | Optical density of image | Scratch resistance of image | Ejection stability of Ink |
|---|---|---|---|---|---|---|---|---|
| Example 11 | Ink 9 | 4.0 | — | 25 | — | A | A | B |
| Example 12 | Ink 10 | 4.0 | — | 25 | — | A | A | B |
| Example 13 | Ink 11 | 4.0 | — | 25 | — | A | A | B |
| Example 14 | Ink 12 | 4.0 | — | 25 | — | A | A | B |
| Example 15 | Ink 13 | 4.0 | — | 25 | — | A | A | B |
| Example 16 | Ink 14 | 4.0 | 9.0 | 25 | — | A | A | B |
| Example 17 | Ink 15 | 4.0 | 5.7 | 25 | — | A | A | B |
| Example 18 | Ink 16 | 4.0 | 4.0 | 25 | — | B | A | B |
| Example 19 | Ink 17 | 4.0 | 4.0 | 25 | — | B | A | B |
| Example 20 | Ink 18 | 4.0 | 4.0 | 25 | — | B | A | B |
| Example 21 | Ink 19 | 4.0 | 4.0 | 25 | — | B | A | B |
| Example 22 | Ink 20 | 4.0 | 4.0 | 25 | — | B | A | B |
| Example 23 | Ink 21 | 4.0 | — | 25 | — | A | A | B |
| Example 24 | Ink 22 | 4.0 | — | 25 | — | B | A | B |
| Example 25 | Ink 23 | 5.0 | — | 25 | — | A | B | B |
| Example 26 | Ink 24 | 5.0 | — | 25 | — | A | B | B |
| Example 27 | Ink 25 | 0.3 | — | 25 | — | B | AA | B |
| Example 28 | Ink 26 | 4.0 | — | 25 | — | A | AA | B |
| Example 29 | Ink 27 | 0.5 | — | 25 | — | A | A | B |
| Example 30 | Ink 28 | 1.5 | — | 25 | — | A | B | B |
| Example 31 | Ink 29 | 4.0 | — | 25 | — | A | A | A |
| Example 32 | Ink 30 | 4.0 | — | 25 | — | A | A | A |
| Example 33 | Ink 31 | 4.0 | — | 25 | — | A | A | A |
| Example 34 | Ink 32 | 4.0 | — | 25 | — | A | A | A |
| Example 35 | Ink 33 | 4.0 | — | 25 | — | A | A | A |
| Example 36 | Ink 34 | 4.0 | — | 25 | — | A | A | A |
| Example 37 | Ink 35 | 4.0 | — | 25 | — | B | A | A |
| Example 39 | Ink 36 | 4.0 | — | 25 | — | B | A | A |
| Example 40 | Ink 37 | 4.0 | — | 25 | — | B | A | A |
| Example 41 | Ink 38 | 4.0 | — | 25 | — | B | A | A |
| Example 42 | Ink 39 | 4.0 | — | 25 | — | B | A | A |
| Example 43 | Ink 71 | 4.0 | — | 25 | — | A | A | B |

Ink recording conditions and evaluation results

| Example No. | Ink No. | Content of pigment/ Content of acrylic resin particles (times) | Total content of water-soluble organic solvent of Group/Total content of water-soluble organic solvent other than Group (times) | Surface temperature of recording medium at application of ink (° C.) | Tension applied to recording medium (N/m) | Optical density of image | Scratch resistance of image | Ejection stability of Ink |
|---|---|---|---|---|---|---|---|---|
| Comparative Example 1 | Ink 40 | 4.0 | 3.0 | 25 | — | C | A | B |
| Comparative Example 2 | Ink 41 | 4.0 | 2.3 | 25 | — | C | A | B |
| Comparative Example 3 | Ink 42 | 4.0 | 1.0 | 25 | — | C | A | B |
| Comparative Example 4 | Ink 43 | 4.0 | 0 | 25 | — | C | A | B |
| Comparative Example 5 | Ink 44 | 4.0 | 0 | 25 | — | C | A | B |

-continued

Ink recording conditions and evaluation results

| Example No. | Ink No. | Content of pigment/Content of acrylic resin particles (times) | Total content of water-soluble organic solvent of Group/Total content of water-soluble organic solvent other than Group (times) | Surface temperature of recording medium at application of ink (° C.) | Tension applied to recording medium (N/m) | Optical density of image | Scratch resistance of image | Ejection stability of Ink |
|---|---|---|---|---|---|---|---|---|
| Comparative Example 6 | Ink 45 | 4.0 | 0 | 25 | — | C | A | B |
| Comparative Example 7 | Ink 46 | 4.0 | 0 | 25 | — | C | A | B |
| Comparative Example 8 | Ink 47 | 4.0 | 0 | 25 | — | C | A | B |
| Comparative Example 9 | Ink 48 | 4.0 | 0 | 25 | — | C | A | B |
| Comparative Example 10 | Ink 49 | 4.0 | 0 | 25 | — | C | A | B |
| Comparative Example 11 | Ink 50 | 4.0 | 0 | 25 | — | C | A | B |
| Comparative Example 12 | Ink 51 | 4.0 | 0 | 25 | — | C | A | B |
| Comparative Example 13 | Ink 52 | 4.0 | 0 | 25 | — | C | A | B |
| Comparative Example 14 | Ink 53 | 4.0 | 0 | 25 | — | C | A | B |
| Comparative Example 15 | Ink 54 | 4.0 | — | 25 | — | C | A | B |
| Comparative Example 16 | Ink 55 | 4.0 | — | 25 | — | C | A | B |
| Comparative Example 17 | Ink 56 | 4.0 | — | 25 | — | C | A | B |
| Comparative Example 18 | Ink 57 | 4.0 | — | 25 | — | C | A | B |
| Comparative Example 19 | Ink 58 | 4.0 | — | 25 | — | C | A | A |
| Comparative Example 20 | Ink 59 | 4.0 | — | 25 | — | C | A | A |
| Comparative Example 21 | Ink 60 | 4.0 | — | 25 | — | C | A | A |
| Comparative Example 22 | Ink 61 | 4.0 | — | 25 | — | C | A | A |
| Comparative Example 23 | Ink 62 | 4.0 | — | 25 | — | C | A | A |
| Comparative Example 24 | Ink 63 | 4.0 | — | 25 | — | C | A | A |
| Comparative Example 25 | Ink 64 | 4.0 | — | 25 | — | C | A | A |
| Comparative Example 27 | Ink 65 | 4.0 | — | 25 | — | C | A | A |
| Comparative Example 28 | Ink 66 | 4.0 | — | 25 | — | C | A | A |
| Comparative Example 29 | Ink 67 | 4.0 | — | 25 | — | C | A | A |
| Comparative Example 30 | Ink 68 | 4.0 | — | 25 | — | C | A | A |
| Comparative Example 31 | Ink 69 | 8.0 | 3.0 | 25 | — | C | B | B |
| Comparative Example 32 | Ink 70 | — | — | 25 | — | A | C | B |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-218728 filed Oct. 21, 2013 and Japanese Patent Application No. 2013-272057 filed Dec. 27, 2013, which are hereby incorporated by reference herein in their entirety.

What is claimed is:

1. An ink comprising:
a self-dispersible pigment;
an acrylic resin particle;
a surfactant;
a water-soluble organic solvent; and
water,
wherein the surfactant includes a fluorinated surfactant having an HLB value of 11 or less determined by a Griffin method and represented by Formula (1):

$$R^1(CR^2R^3)_n CH_2 CH_2 (OCH_2 CH_2)_m OH$$

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less;
wherein the water-soluble organic solvent includes at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol;
wherein the total content of the water-soluble organic solvents of Group A is 4 times or more the total content of water-soluble organic solvents other than the water-soluble organic solvents of Group A in the ink; and
the total content of the self-dispersible pigment and the acrylic resin particle is 10% by mass or less based on the total mass of the ink.

2. The ink according to claim 1 further comprising at least one additive selected from Group B consisting of tetritol, pentitol, hexitol, heptitol, octitol, and polyethylene glycol with a weight-average molecular weight of more than 10,000 and 100,000 or less.

3. The ink according to claim 1, wherein the mass ratio of the content of the self-dispersible pigment to the content of the acrylic resin particle, based on the total mass of the ink, is 0.5 or more and 4.0 or less.

4. The ink according to claim 1, wherein the content of a surfactant other than the fluorinated surfactant is 0.1% by mass or less based on the total mass of the ink.

5. The ink according to claim 1, wherein the acrylic resin particle has a glass transition temperature of 25° C. or more.

6. An ink cartridge comprising an ink storage portion for storing ink, wherein the ink stored in the ink storage portion is the ink according to claim 1.

7. An image-recording method comprising:
a conveying step of conveying a recording medium; and
an ink-applying step of applying an ink to the recording medium,
wherein the ink is the ink according to claim 1.

8. The image-recording method according to claim 7, further comprising a heating step of heating the recording medium provided with the ink subsequently to the ink-applying step such that the surface temperature of the recording medium is 70° C. or more.

9. The image-recording method according to claim 7, wherein the ink is applied to the recording medium with a tension of 20 N/m or more in the ink-applying step.

10. The image-recording method according to claim 7, wherein the conveying speed of the recording medium in the conveying step is 50 m/minute or more.

11. An ink comprising:
a self-dispersible pigment;
an acrylic resin particle;
a surfactant;
a water-soluble organic solvent; and
water,
wherein the surfactant includes a fluorinated surfactant having an HLB value of less than 10 determined by a Griffin method and represented by Formula (1):

$$R^1(CR^2R^3)_n CH_2 CH_2 (OCH_2 CH_2)_m OH$$

wherein, $R^1$ represents a fluorine atom or a hydrogen atom; $R^2$ and $R^3$ each independently represent a fluorine atom or a hydrogen atom, provided that at least one of $R^2$ and $R^3$ represents fluorine atom; n represents a number of 1 or more and 30 or less; and m represents a number of 1 or more and 60 or less;
wherein the water-soluble organic solvent includes at least one water-soluble organic solvent selected from Group A consisting of glycerin, ethylene glycol, diethylene glycol, polyethylene glycol with a weight-average molecular weight of 10,000 or less, 1,3-propanediol, 1,4-butanediol, and diglycerol;
wherein the total content of the water-soluble organic solvents of Group A is 4 times or more the total content of water-soluble organic solvents other than the water-soluble organic solvents of Group A in the ink; and
the total content of the self-dispersible pigment and the acrylic resin particle is 10% by mass or less based on the total mass of the ink.

* * * * *